Dec. 10, 1968       E. E. KADUK       3,416,019
ZINC SILICATE PHOSPHOR OF IMPROVED MAINTENANCE
Filed Dec. 14, 1964

PREPARATION OF ZINC SILICATE
$MgF_2 - NH_4Cl$ METHOD

TWIN SHELL BLENDER
ZnO  $SiO_2$
$MgF_2$  $MnCO_3$

BALL MILL

FURNACE
1250°–1350°C

BALL MILL
ADD $NH_4Cl$

DISC MILL

FURNACE
1250°–1350°C

CRUSH

FINISHED PHOSPHOR

Inventor:
Edward E. Kaduk
by Emmet W. Hagner
His Attorney

United States Patent Office 3,416,019
Patented Dec. 10, 1968

3,416,019
ZINC SILICATE PHOSPHOR OF
IMPROVED MAINTENANCE
Edward E. Kaduk, Lyndhurst, Ohio, assignor to General
Electric Company, a corporation of New York
Filed Dec. 14, 1964, Ser. No. 418,229
9 Claims. (Cl. 313—109)

ABSTRACT OF THE DISCLOSURE

A green zinc silicate phosphor which is white bodied and improved particularly with respect to maintenance under high loading. It comprises the usual zinc silicate phosphor ingredients, namely, ZnO, $SiO_2$, and MnO for the activator plus a minor addition of $MgF_2$. The stoichiometric base/acid ratio of 2:1 is observed and in determining the base/acid ratio, all basic elements are included, that is mole fractions of manganese and magnesium are included with those of zinc in determining total moles of base. Preferably the phosphor is prepared by firing the recited ingredients in the temperature range of 1250 to 1350° C., milling and refiring in the same temperature range with a small addition of $NH_4Cl$.

---

This invention relates to an improved zinc silicate phosphor and to an improved method for its preparation.

Zinc silicate containing manganese as a luminescent activator was among the earliest phosphors known and occurs in nature as the mineral willemite. The natural phosphors are relatively impure but improved materials artificially prepared were used in early fluorescent lamps. Zinc silicate activated by manganese as described herein emits in the green.

For applications where the green color is acceptable or desirable, as in the reprographic field for certain processes of document copying, zinc silicate is a useful and highly efficient phosphor. For reprographic applications, high current fluorescent lamps operated at several times the normal current loading are generally preferred. Therefore a zinc silicate having high efficiency and good maintenance in highly loaded lamps is desirable. The decline in light output during the useful though comparatively short service life of such lamps for reprographic use must be made relatively small.

The objects of the invention are to provide a zinc silicate phosphor which is improved in the above respects, along with a convenient and practical method of preparing such phosphor on both small and large scale.

Other objects of the invention along with advantages thereof will become apparent as the description proceeds.

Figure 1:
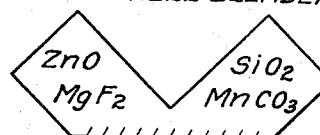
FIG. 1 is a flow diagram illustrating the process of preparing the phosphor in accordance with the invention.
Figure 1:
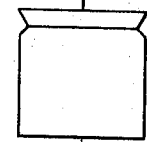
Figure 1:
Figure 1:
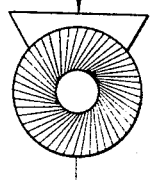
Figure 1:
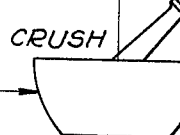

In the early literature on zinc silicate phosphors, it was customary to speak of "theoretical" zinc orthosilicate $Zn_2SiO_4$, frequently written $2ZnO \cdot SiO_2$. Although the orthosilicate formula would generally indicate a base-acid ratio of 2:1, in practice such a stoichiometric ratio could not be adhered to because it resulted in off-white or buff or even dark-bodied phosphors. The dark color was probably due to the manganese activator, part of which would not remain incorporated in the crystal lattice. To avoid this result, U.S. Patent 2,245,414—Roberts taught the use of a larger amount of silica (the acid component) than called for by the orthosilicate formula, which at the same time permitted the use of a higher amount of manganese activator which was desirable from the point of view of luminous efficiency or maximum emission. Thus a commonly used process for preparing a zinc silicate manganese-activated phosphor prior to my invention called for mixing zinc oxide and silica in a molar ratio of about 1.5–1.8 to 1, along with a few percent of manganese in the form of the carbonate. This mix was fired at a temperature in the range of 1250 to 1350° C. By way of example, a phosphor so produced, when incorporated in a conventional 48″ T12 40-watt fluorescent lamp (nominally 48″ long by 1½″ in diameter) operated at 420 milliamperes, resulted in an initial luminous output of about 90 lumens per watt which dropped to about 75 lumens per watt after 100 hours of burning, for a loss of 17%, as reported in U.S. Patent 2,656,320—Nagy et al.

Over the years improvements in phosphor raw materials, phosphor preparation and lamp manufacture have brought about an increase in absolute lumen level to approximately 108 lumens per watt initially, and 101 lumens per watt at 100 hours, for a loss of only 7% with phosphors of mole ratio 1.5–1.8 to 1. However, when this latter phosphor material was tested in highly loaded lamps of the same cross section operated at 1500 milliamperes, which is more than three times the normal current loading (420 milliamperes), the lumen loss from zero to 100 hours increased to 30–40%. A loss of this magnitude is not acceptable for lamps used in reprographic work, which require heavy loading.

Early tests at both normal and high lamp loadings indicated that the zinc silicate phosphor performance could be improved as the phosphor composition was made to approach the 2:1 mole ratio more closely. It became necessary therefore, to find a method of phosphor preparation and a composition which would permit reproducible and larger scale production of orthosilicate material more reliably, particularly for use in lamps with high current loading.

In accordance with my invention, I have found that by firing the usual zinc silicate phosphor ingredients with a minor addition of magnesium fluoride, a white bodied phosphor is obtained even at the stoichiometric base/acid ratio of 2:1 in the final product. This method has been successful with both laboratory-sized samples as well as large production-sized batches. In determining the base/acid ratio, all basic elements are included, that is, the mole fractions of manganese and magnesium are added to that of zinc to determine total moles of base. This is necessary because the final phosphor is a homogeneous solid solution of zinc-magnesium-manganese orthosilicate as determined by X-ray diffractometry. The acid moles consist only of silica, but any losses during firing due to a reaction between silica and magnesium fluoride are also taken into account, as explained below.

As stated above, the emission of this manganese-activated zinc magnesium orthosilicate phosphor lies in the green range of the spectrum with a peak emission around 5250 A.—more or less, depending upon the manganese concentration, but essentially independent of the magnesium concentration. Typically a suitable manganese concentration in the phosphor lies in the conventional range of about 1% to 4.5% MnO by weight. This is equivalent to .015 to .07 mole MnO per mole of orthosilicate.

The partial substitution of zinc by magnesium is unlike another substitution in the zinc silicate base material which can be made with beryllium. By replacing part of the zinc with beryllium, manganese-activated zinc beryllium silicate is obtained whose emission spectrum is greatly altered when compared with zinc or zinc-magnesium silicate. It covers a much broader part of the spectrum and peaks in the yellow or orange range, depending upon composition. Zinc beryllium silicate was at one time extensively used in mixture with other phosphors in fluorescent lamps of various shades of white, until it was replaced by the alkaline earth halophosphate phosphors which are now the most widely used materials.

According to another feature of my invention, the phosphor is double fired, the first time as described above, then ball milled and refired with a small addition of ammonium chloride. Alternatively, the ammonium chloride can be added in aqueous solution and then dried down unto the phosphor. A phosphor so prepared, when incorporated into a standard 40-watt fluorescent lamp, provided an initial output in excess of 120 lumens per watt, and 116 lumens per watt after 100 hours burning. This represents a loss of only 3.3% in 100 hours of burning, cutting the loss in half compared with the best previous phosphor mentioned. It is a substantial improvement over the 90.9 LPW figure which U.S. Patent 2,656,320—Nagy et al. claims for its zinc silicate phosphor compounded with other magnesium compounds and actually departing far from orthosilicate formulation.

A suitable batch formula for a phosphor according to my invention is as follows:

| | Grams |
|---|---|
| Zinc oxide (phosphor grade) | 760 |
| Silica (Mallinckrodt SL grade 8.2% $H_2O$) | 333 |
| Manganese carbonate (44.5% Mn) | 58 |
| Magnesium fluoride | 13 |

An equivalent quantity of MnO or manganese salt heat-decomposable to MnO may be used in lieu of $MnCO_3$. The molar composition of the above raw mix may be given as:

$$1.83ZnO \cdot .093MnO \cdot .04MgF_2 \cdot 1.00SiO_2$$

Figure 2:
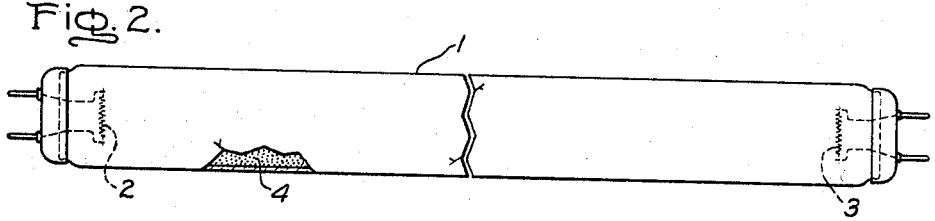
FIG. 2 is a side view, partly sectioned, of a fluorescent lamp with a phosphor coat embodying the invention.

A preferred processing method in accordance with my invention is indicated in FIG. 1. The ingredients are first blended together in a twin shell blender for 10 to 15 minutes and then ball milled together in a one-gallon ball mill for 45 minutes. The ingredients are next fired in uncovered trays at a temperature in the range of 1250 to 1350° C., desirably about the mid-point of this range, suitably 1290 to 1300° C., for a time sufficient to assure full reaction, suitably about 3 hours for the stated batch. The fired cake is then crushed with mortar and pestle or other suitable means and screened to remove oversize material. If desired, processing may be deemed complete at this point, and the phosphor applied by known techniques to the inner envelope wall of a fluorescent lamp 1 as shown in FIG. 2. Such a lamp has activated electrodes 2, 3 sealed into opposite ends and contains a filling of inert gas at a pressure of a few millimeters of mercury and a small amount of mercury sufficient to provide a mercury vapor pressure of 5 to 10 microns during operation. The phosphor is applied as an internal coating 4 which may extend over the entire periphery of the envelope wall, or over part only as in aperture type lamps.

The phosphor of the preceding batch formulation applied in a lamp as described gave an efficiency of 88 LPW after 200 hours of operation at high current loading, that is at 1500 milliamperes in a lamp of 1½ inches nominal diameter. This compares with an efficiency of only 73.5 LPW for a control phosphor made as close to stoichiometric orthosilicate proportions as can be achieved without magnesium fluoride. The improvement amounts to 20% and this result substantiates my statement above to the effect that phosphors approaching the orthosilicate composition more closely give better maintenance than the prior art phosphors of mole ratio 1.5 to 1.8:1. The latter materials had efficiencies considerably less than 73.5 LPW after 200 hours of high loading operation.

Additionally, however, for further improvements the phosphor may be processed beyond the stages previously described. After crushing, following the first firing previously described, 1000 grams of the phosphor are well mixed, by ball milling for example, with 1.2 grams of solid ammonium chloride (0.12% by weight or .005 mole). The phosphor is then fired a second time at the same temperature, again for a period of approximately three hours. The phosphor is then comminuted, for example in a disc mill, and is ready to be suspended in a binder and applied to a lamp. Such phosphors gave efficiencies of 104 LPW at 100 hours and of 98 LPW after 200 hours of operation at high current loading, for a total loss of only 12% from zero to 100 hours and of 17% from zero to 200 hours. As previously mentioned, the losses with prior art phosphors were in the range of 30 to 40%; thus my invention has reduced the lumen losses by one-half to two-thirds.

I have found that the optimum base/acid ratio in the zinc silicate is substantially stoichiometric, that is 2 to 1. Although exact stoichiometry appears to be optimum, in practice a minor departure may be tolerated and the benefits of the invention yet realized. Thus I have found that the base/acid ratio in the raw material mix may fall as low as 1.95/1 and rise to 2.05/1. As a result of the losses previously discussed, this leads to fired compositions wherein the base/acid ratio will fall in the range from 1.96/1 to 2.01/1. This range wherein the departure from exact stoichiometry does not exceed 2% is intended when the phosphor product is described as "substantially stoichiometric."

In order to achieve a white body phosphor at the substantially stoichiometric ratio, the addition of $MgF_2$ is essential. Although small additions of magnesium salt in the form of the nitrate, carbonate, hydroxide, oxide, or compounds readily decomposable to the oxide have been proposed heretofore in U.S. 2,656,320—Nagy et al., in which connection the magnesium has been referred to as a second or additional activator, I have found that the fluoride is unique in its much greater effectiveness. It appears that in my process magnesium fluoride serves as a mineralizer to promote the formation of better crystallized $Zn_2SiO_4$ crystals with both Mg and Mn properly incorporated within the lattice. This result has not been obtained with the simple oxide-yielding magnesium compounds. I have explained my results by considering that the magnesium fluoride reacts with silica at the high firing temperature to produce volatile silicon tetrafluoride and magnesium silicate according to a simple reaction such as:

$$2MgF_2 + 2SiO_2 \longrightarrow SiF_4 \nearrow + Mg_2SiO_4$$

At the low magnesium concentrations utilized here, and while $SiF_4$ may still be present as a gaseous catalyst, nascent magnesium silicate forms a solid solution with zinc and manganese orthosilicates, as shown by precision X-ray determination of lattice parameters. The silicon tetrafluoride is eventually volatilized out, being a gas even at room temperature, and the resulting loss of silicon reduces the acidity and raises the base/acid ratio. In computing the base/acid ratio of the fired product, such loss must be taken into account. In the batch formula given earlier, the moles of ZnO, Mn, and $MgF_2$ add up to 1.963 as against 1.000 mole of $SiO_2$. However, with the total loss of the $SiF_4$ formed by the reaction of magnesium fluoride with silica, the moles of $SiO_2$ are reduced to 0.980. The fraction thus becomes 1.963/0.980, that is, a base/acid ratio of 2.003/1.

I have found that highest lamp brightness is obtained with phosphors which have a molar ratio of $MgF_2$ to $SiO_2$ in the range of about .01 to 0.1:1 in the raw batch composition. The exact location of the optimum within this range is connected with the fineness and method of preparation of the silica used in preparing the phosphor. Thus with an extremely fine silica (such as Cabosil-Godfrey Cabot Corp.). I have found the optimum $MgF_2/SiO_2$ mole ratio to be from .02 to .06. With a coarser silica (e.g. Standard Luminescent Grade—Mallinckrodt Chemical Company) I have found the optimum to be from .04 to .10.

The addition of a small amount of ammonium chloride $NH_4Cl$, to the extent of between 0.1% and 0.6% by weight, to the milled phosphor at the second firing is beneficial particularly in improving the maintenance. During the second firing, $NH_4Cl$ dissociates into $NH_3$ and $HCl$ and some of the hydrochloric acid gas reacts as a scavenger with free or unreacted zinx oxide to form $ZnCl_2$. Inasmuch as zinc chloride boils at 732° C. and firing is taking place at about 1300° C., any zinc chloride formed volatilizes out along with the ammonia gas. It may be noted that any loss of zinc lowers the base/acid ratio. For the formulation which has been given, the loss of Zn as $ZnCl_2$ would reduce the base/acid ratio from 2.003 to 1.998 if all of the chloride were used to produce $ZnCl_2$. It is apparent that this change is so minor that the phosphor stays within the limits defined above as constituting stoichiometry. That is, the phosphor corresponds substantially to the formula for zinc orthosilicate where the base or metallic term consists not only of zinc but also includes any manganese and magnesium present. With the larger amounts of additives specified, the changes are slightly larger but not so great as to exclude such compositions from consideration as substantially orthosilicate formulations.

Phosphors prepared as described in my examples have given an initial efficiency in general higher than the phosphors of the prior art, for instance, from 120 to 130 LPW and more in regular 40-watt lamps at normal current loading. On the average, this has led to a lumen loss of about 6% from zero to 100 hours. More importantly, however, when used in heavily loaded lamps operated at three or more times the normal current loading, the improved phosphors lost only an average of about 12% in 100 hours of lamp burning. At later stages in lamp life the differences in favor of the material of this invention remain or actually increase. For example, in several tests, the old control phosphor lost about 50%, while the phosphors as described herein lost only 17 to 22% after 200 hours operation at high current loading.

The improvement due to various magnesium fluoride concentrations in phosphors of orthosilicate composition, all fired with a constant amount of 0.12% by weight of ammonium chloride at the second firing stage as shown in the flow diagram of FIG. 1, is shown in the following table:

| Moles, $MgF_2$ | Output, Lumens per watt at— | | | Loss in percent of initial output | |
|---|---|---|---|---|---|
| | 0 hrs. | 100 hrs. | 200 hrs. | From 0–100 hrs. | From 0–200 hrs. |
| 0 | 111.7 | 84 | 73.6 | 24.8 | 34.2 |
| 0.02 | 114.4 | 100.8 | 95.6 | 11.9 | 16.4 |
| 0.04 | 117.7 | 106.8 | 101.1 | 9.3 | 14.1 |
| 0.08 | 124 | 110.5 | 104 | 10.9 | 16.1 |

From this table it is again apparent that the use of magnesium fluoride and ammonium chloride in the preparation of zinc silicate phosphor has resulted in a substantial reduction of both the 100 hour and the 200 hour percentage losses, and, at the same time, in a substantial increase of the absolute LPW (lumens per watt) readings at all burning intervals. These gains were greater than were obtained with magnesium oxide yielding material alone.

Even when used in regular 40-watt lamps operated at the normal current of 420 milliamperes, the phosphor prepared as described herein gives superior performance. Thus 100 hour efficiencies of 116 LPW are being obtained in regular factory lamp production, a figure higher than any heretofore reported.

What I claim as new and desire to secure by Letters Patent of the United States is:

1. A green-emitting manganese-activated white-bodied zinc silicate phosphor consisting of zinc orthosilicate having manganese and magnesium incorporated into the lattice, the base/acid ratio being within 2% of 2 to 1 wherein the moles of base include the mole fractions of Mn and Mg in addition to that of ZnO and the moles of acid consist of moles of $SiO_2$, the mole fraction of magnesium being from .01 to 0.1 per mole of silicate.

2. A green-emitting manganese-activated white-bodied zinc silicate phosphor consisting of zinc orthosilicate having manganese and magnesium incorporated into the lattice, the base/acid ratio being within 2% of 2 to 1 wherein the moles of base include the mole fractions of Mn and Mg in addition to that of ZnO and the moles of acid consist of moles of $SiO_2$, the mole fraction of manganese being from .015 to .07 and the mole fraction of magnesium being from .01 to 0.1 per mole of silicate.

3. A green-emitting manganese activated white-bodied zinc silicate phosphor consisting of zinc orthosilicate having manganese and magnesium completely incorporated within the lattice and being the fired product of the batch formula $1.83ZnO \cdot .093MnO \cdot .04MgF_2 \cdot 1.00SiO_2$.

4. A green-emitting manganese activated white-bodied zinc silicate phosphor consisting of zinc orthosilicate having manganese and magnesium completely incorporated within the lattice and being the fired product of the batch formula $1.83ZnO \cdot .093MnO \cdot .04MgF_2 \cdot 1.00SiO_2$ which has been refired with .005 $NH_4Cl$.

5. A fluorescent lamp comprising a vitreous envelope having electrodes sealed into its ends and containing a filling of an inert gas at a low pressure and a small quantity of mercury, said envelope being coated internally with the phosphor of claim 2.

6. The method of making a green-emitting manganese-activated white-bodied zinc silicate phosphor having improved efficiency and maintenance which comprises mixing together zinc oxide, silica, a manganese salt heat-decomposable to oxide, and magnesium fluoride in proportions achieving a base/acid ratio within 2% of 2 to 1, wherein the moles of base include the mole fractions of Mn and Mg in addition to that of ZnO, and the moles of acid consist of moles of silica, and wherein the proportion of Mg is .01 to 0.1 mole per mole of silica, and firing in uncovered trays at a temperature in the range of 1250 to 1350° C. until the reaction is complete.

7. The method of making a green-emitting manganese-activated white-bodied zinc silicate phosphor having improved efficiency and maintenance which comprises mixing together zinc oxide, silica, a manganese salt heat-decomposable to oxide, and magnesium fluoride in proportions achieving a base/acid ratio within 2% of 2 to 1, wherein the moles of base include the mole fractions of Mn and Mg in addition to that of ZnO, and the moles of acid consist of moles of silica, and wherein the proportion of Mg is .01 to 0.1 mole per mole of silica, firing in uncovered trays at a temperature in the range of 1250 to 1350° C. until the reaction is complete, mixing the fired cake with ammonium chloride in a proportion of 0.1% to 0.6% by weight of phosphor, and then refiring in the same temperature range and for a like time interval.

8. The method of making a green-emitting manganese-activated white-bodied zinc silicate phosphor having improved efficiency and maintenance which comprises mixing together zinc oxide, silica, a manganese salt heat-decomposable to oxide, and magnesium fluoride in proportions achieving a base/acid ratio within 2% of 2 to 1, wherein the moles of base include the mole fractions of Mn and Mg in addition to that of ZnO, and the moles of acid consist of moles of silica, and wherein the proportion of Mg is .01 to 0.1 mole per mole of silica and the proportion of Mn is .015 to .07 mole per mole of silica, firing in uncovered trays at a temperature in the range of 1250 to 1300° C. until the reaction is complete, milling mixing with ammonium chloride in a proportion of 0.1% to 0.6% by weight of phosphor, and then refiring in the same temperature range and for a like time interval.

9. A fluorescent lamp comprising a vitreous envelope having electrodes sealed into its ends and containing a filling of an inert gas at a low pressure and a small quantity of mercury, said envelope being coated internally with the phosphor of claim 3.

References Cited

UNITED STATES PATENTS

| 2,124,225 | 7/1938 | Batchelor | 252—301.6 |
| 2,238,026 | 4/1941 | Moore | 252—301.6 |
| 2,306,270 | 12/1942 | Leverenz | 252—301.6 |
| 2,457,054 | 12/1948 | Leverenz | 252—301.6 |
| 2,597,631 | 5/1952 | Froelich | 252—301.4 |

TOBIAS E. LEVOW, *Primary Examiner.*

ROBERT D. EDMONDS, *Assistant Examiner.*

U.S. Cl. X.R.

252—301.6